(12) United States Patent
Chang

(10) Patent No.: US 8,769,777 B2
(45) Date of Patent: Jul. 8, 2014

(54) PIPE CLAMPING DEVICE

(71) Applicant: Kyung Kun Chang, Surrey (CA)

(72) Inventor: Kyung Kun Chang, Surrey (CA)

( * ) Notice: Subject to any disclaimer, the term of this patent is extended or adjusted under 35 U.S.C. 154(b) by 0 days.

(21) Appl. No.: 13/751,068

(22) Filed: Jan. 26, 2013

(65) Prior Publication Data

US 2013/0277967 A1     Oct. 24, 2013

(30) Foreign Application Priority Data

Apr. 23, 2012 (KR) ........................ 10-2012-0042181

(51) Int. Cl.
*F16L 21/00* (2006.01)
*F16L 21/05* (2006.01)
*F16L 33/04* (2006.01)
*F16L 33/08* (2006.01)

(52) U.S. Cl.
CPC *F16L 33/04* (2013.01); *F16L 33/08* (2013.01)
USPC ............. 24/274 R; 285/419; 285/236; 285/45

(58) Field of Classification Search
USPC ........ 24/274 R, 279, 280, 284, 285; 285/236, 285/242, 245, 252, 365–367, 417, 419
See application file for complete search history.

(56) References Cited

U.S. PATENT DOCUMENTS

| | | | | |
|---|---|---|---|---|
| 1,671,161 A * | 5/1928 | Perks | ........................ | 277/616 |
| 3,586,354 A * | 6/1971 | Boscacci | ........................ | 285/369 |
| 4,135,744 A * | 1/1979 | Fouts | ........................ | 285/253 |
| 4,417,755 A * | 11/1983 | Gittleman | ........................ | 285/373 |
| 4,518,177 A * | 5/1985 | Deakins | ........................ | 285/64 |
| 4,822,077 A * | 4/1989 | Hendrickson | ........................ | 285/12 |
| 5,430,252 A * | 7/1995 | Petersen | ........................ | 174/665 |
| 5,722,695 A * | 3/1998 | Matsumoto et al. | ........................ | 285/23 |
| 5,722,701 A * | 3/1998 | Choi | ........................ | 285/337 |
| 7,390,026 B2 * | 6/2008 | Noda | ........................ | 285/112 |
| 7,770,941 B2 * | 8/2010 | Ward | ........................ | 285/419 |
| 8,186,725 B2 * | 5/2012 | Ward | ........................ | 285/419 |
| 8,256,800 B2 * | 9/2012 | Ward | ........................ | 285/45 |
| 8,448,995 B2 * | 5/2013 | Ward | ........................ | 285/419 |
| 2007/0257488 A1 * | 11/2007 | Jimenez | ........................ | 285/404 |
| 2009/0230675 A1 * | 9/2009 | Densmore | ........................ | 285/236 |

FOREIGN PATENT DOCUMENTS

KR    20-2011-0007082 U    7/2011

* cited by examiner

*Primary Examiner* — Robert J Sandy
*Assistant Examiner* — Rowland Do
(74) *Attorney, Agent, or Firm* — KORUS Patent, LLC; Seong Il Jeong

(57) ABSTRACT

A pipe clamping device that clamps a first pipe and a second pipe each other, the pipe clamping device having an annular case with a central opening into which the first pipe and the second pipe are inserted; a tightening member movable between a tightening location where the tightening member tightens outer circumferential surface of the first pipe and the second pipe and a disengagement location where the tightening member does not impose pressure on the outer circumferential surface of the first pipe and the second pipe; and a stopper restricting radial movement of the tightening member such that the diameter of the tightening member at the disengagement location does not extend beyond a predetermined number, the stopper being prepared in the annular case. The pipe clamping device provides easy clamping of pipes since the tightening member at a disengagement location has a predetermined diameter by the stopper of the case.

13 Claims, 10 Drawing Sheets

PIPE CLAMPING DEVICE

BACKGROUND OF THE INVENTION

1. Field of the Invention

The present invention relates to a pipe clamping device, and more particularly, a pipe clamping device that clamps pipes easily using a tightening member that, when not yet connected to a pipe, has a pre-determined diameter which is set by a stopper which restricts movement of the tightening member.

2. Background of the Related Art

A pipe clamping device is a device that clamps two pipes each other. FIG. 1 illustrates an example of the pipe clamping device 1. The pipe clamping device 1, a kind of hose clamp, is a so-called screw clamp generally used and is also called a Worm Drive Clamp.

The pipe clamping device 1 clamps two pipes when a second pipe P2 of a soft material is inserted into a first pipe P1 of a hard material protruded from a wall W, is widely used to clamp a bellows P2 connected to a drying and washing machine and an exhaust pipe P1 installed in a wall W of a building.

The pipe clamping device 1 comprises a band 2 having strip-shape, an adjustment screw fixing member 4 fixed at one end of the band 2, an adjustment screw 3 rotatably fixed in the adjustment screw fixing member 4, and adjustment slots 5 coupled to a thread part (not illustrated) of the adjustment screw 3. The pipe clamping device 1 has a structure such that the inner diameter of the band 2 increases or decreases, depending on the rotation direction of the adjustment screw 3. Since the structure and effects of the pipe clamping device 1 are widely understood by those skilled in the art, a detailed explanation about them will be omitted.

The pipe clamping device 1, as illustrated in FIG. 2, surrounds the outer circumferential surface of the second pipe P2 after the first pipe P1 is inserted into the second pipe P2 such that the outer circumferential surface of the first pipe P1 and the inner circumferential surface of the second pipe P2 are in contact with each other. The pipe clamping device 1 is configured such that, by rotating the adjustment screw 3 in one direction, the band 2 imposes pressure on the outer circumferential surface of the second pipe P2 and clamps the pipes P1 and P2 to each other.

However, since it is convenient that the pipe clamping device 1 is placed in contact with the outer circumferential surface of the second pipe P2 before the second pipe P2 is inserted into the first pipe P1, the pipe clamping device 1 is placed on the outer circumferential surface of the second pipe P2 after increasing the inner diameter of the band 2 to larger than the outer diameter of the second pipe P2. In this case, there is a drawback that it is not easy to adjust the inner diameter of the band 2 to an appropriate size at which the band 2 can be placed on the outer circumferential surface of the second pipe P2.

In the event that the inner diameter of the band 2 is increased too much, the pipe clamping device 1 is no longer capable of being placed in contact with the outer circumferential surface of the second pipe P2 and may be easily separated from the second pipe P2. Also, the adjustment screw 2 must be rotated relatively many times in order the band 2 to impose pressure on the outer circumferential surface of the second pipe P2. In the event that the inner diameter of the band 2 is adjusted to too much, the pipe clamping device 1 cannot be placed on the outer circumferential surface of the second pipe P2.

In addition, the pipe clamping device 1, as illustrated in FIG. 2, has poor ornamental aesthetics because it is exposed externally when clamping the two pipes P1, P2. The pipe clamping device 1 may also be susceptible to corrosion from rain when the device is installed outside.

SUMMARY OF THE INVENTION

The present invention is intended to resolve the above problems and to provide an improved pipe clamping device so that clamping of pipes can be easily performed by using a tightening member having a pre-determined diameter as set by a stopper which restricts movement of the tightening member.

In order to achieve the goal, as a pipe clamping device for clamping a first pipe and a second pipe, the pipe clamping device according to the present invention comprises an annular case with central opening into which the first pipe and the second pipe can be inserted, the central opening being formed in an inner circumferential surface of the annular case; a tightening member movable between a tightening location where the tightening member tightens outer circumferential surfaces of the first pipe and the second pipe and a disengagement location where the tightening member does not impose pressure on the outer circumferential surfaces of the first pipe and the second pipe, the tightening member being an annular member and being disposed in the outer circumferential surface of the case; a stopper restricting a radial movement of the tightening member such that a diameter of the tightening member at the disengagement location does not extend beyond a predetermined number, the stopper being prepared in the annular case.

To prevent the tightening member from disengaging from the annular case at the tightening location and the disengagement location, it is desirable that disengagement prevention projections protruded in a radial direction are formed in the tightening member and disengagement prevention grooves into which the disengagement prevention projections are inserted are formed in the annular case.

It is also desirable that the annular case includes an insertion guide formed along edge of the central opening which protrudes forwardly from the case such that its radius increases in the forward direction.

It is also desirable that the tightening member includes an adjustment screw rotatable in both directions, the adjustment screw having a head part at one end and a thread part at the other end and, by the adjustment screw, is gradually movable between a tightening location and a disengagement location.

It is also desirable that the case has an outer circumferential surface and includes an adjustment screw exposure space, as a room for arranging the head part of the adjustment screw, to prevent the head part of the adjustment screw from protruding beyond the outer circumferential surface of the case.

It is also desirable that the pipe clamping device further comprises an adjustment screw fixing member which is fixed at one end of the tightening member and rotatably fixes the adjustment screw; and a plurality of adjustment slots which are formed at the other end of the tightening member and coupled with the thread part of the adjustment screw.

It is also desirable that the case comprises an adjustment screw mounting space into which the adjustment screw fixing member is inserted in order to prevent the adjustment screw fixing member from disengaging from the case.

It is also desirable that the rear face of the case is open; the tightening member is disposed in the rear face of the case; the case includes a cover that is detachably coupled with the rear face of the case, the cover being an annular plate type member with central opening into which the first pipe and the second pipe are inserted; and the rear face of the case is closed by the cover.

Clamping pipes according to the present invention is easily performed since the pipe clamping device comprises an annular case with central opening; a tightening member which is disposed on the inner circumferential surface of the case and movable between a tightening location where the tightening member tightens outer circumferential surface of the pipes and a disengagement location where the tightening member does not impose pressure on the outer circumferential surface of the pipes; and a stopper which is located in the annular case and restricts a radial movement of the tightening member at the disengagement location and, thus, the pipe clamping device has a predetermined diameter because the diameter of the tightening member at the disengagement location is restricted by the stopper of the annular case.

DETAILED DESCRIPTION OF THE INVENTION

Hereinafter, the present invention will be described in detail by explaining embodiments of the pipe clamping device with reference to the attached drawings.

Figure 1:
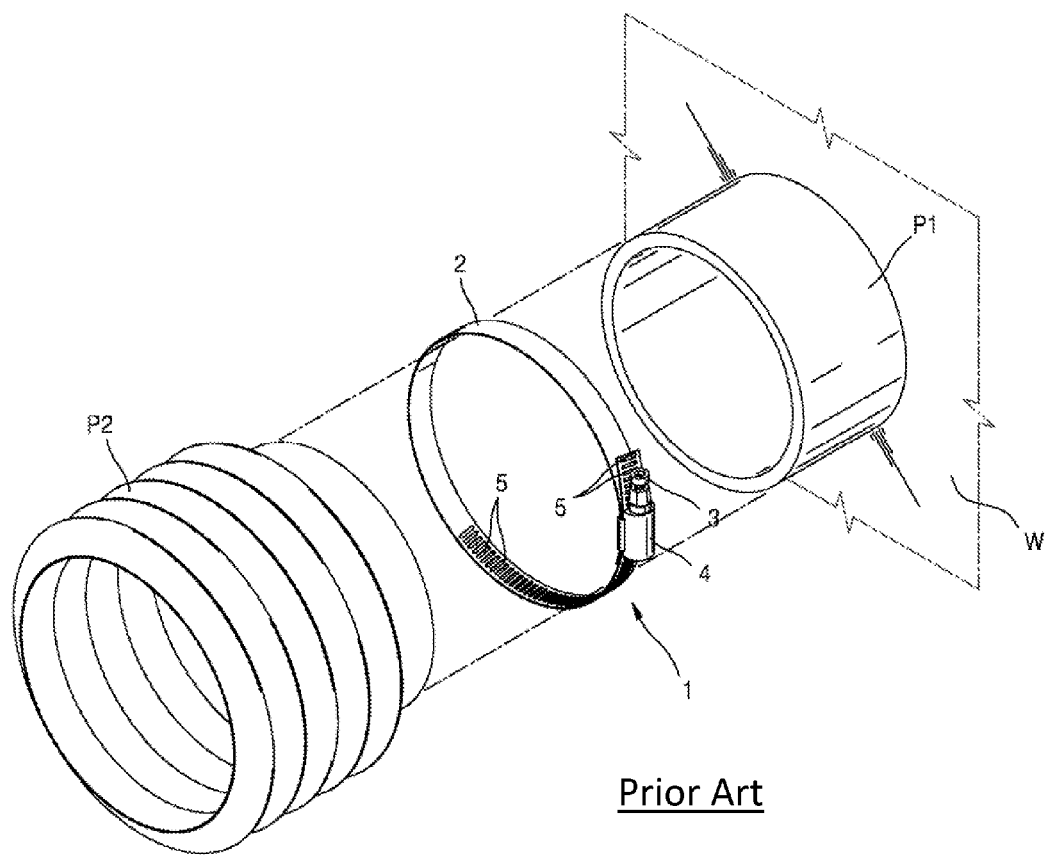
FIG. 1 is a perspective view of a prior art pipe clamping device.
Figure 2:
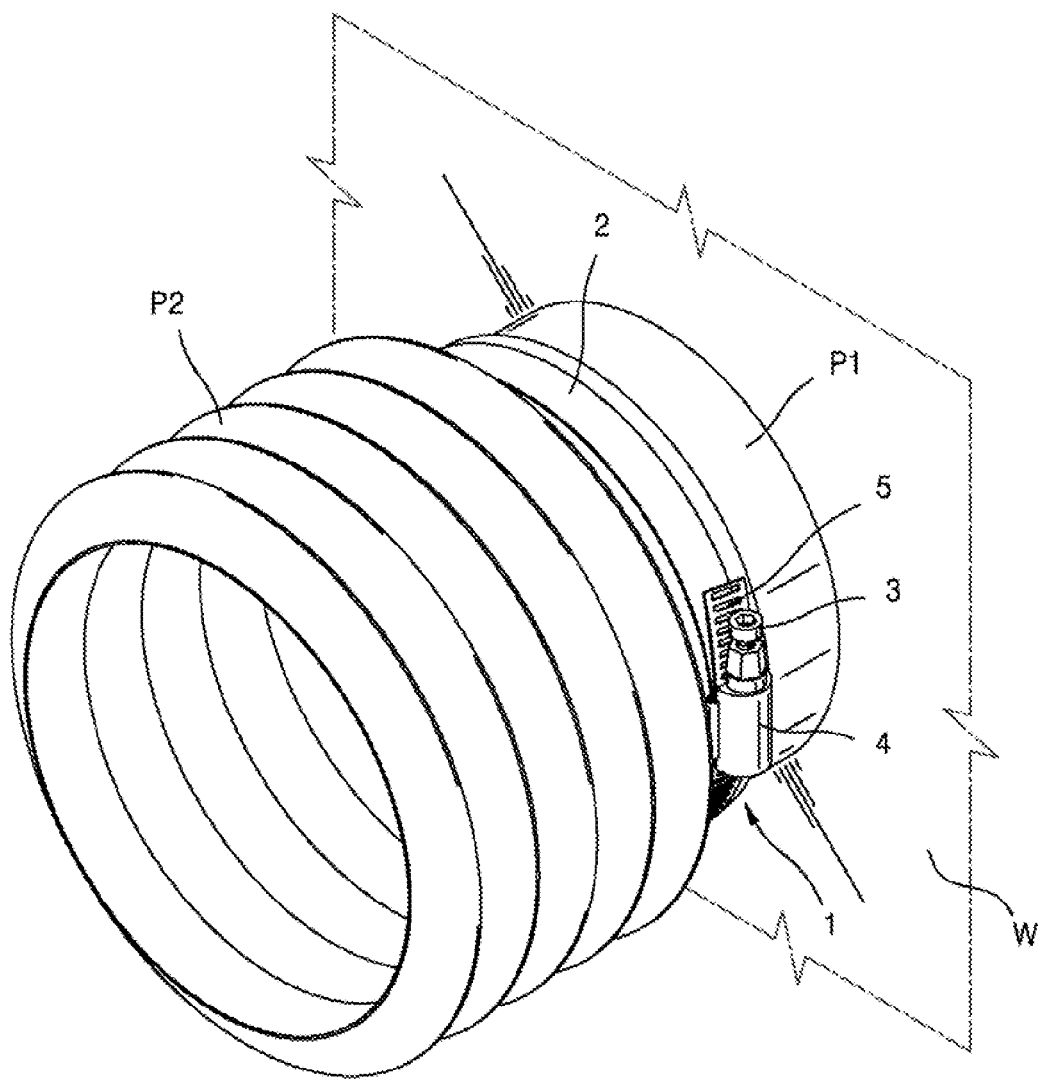
FIG. 2 is a perspective view of a coupled two pipes utilizing the pipe clamping device illustrated in FIG. 1.
Figure 3:
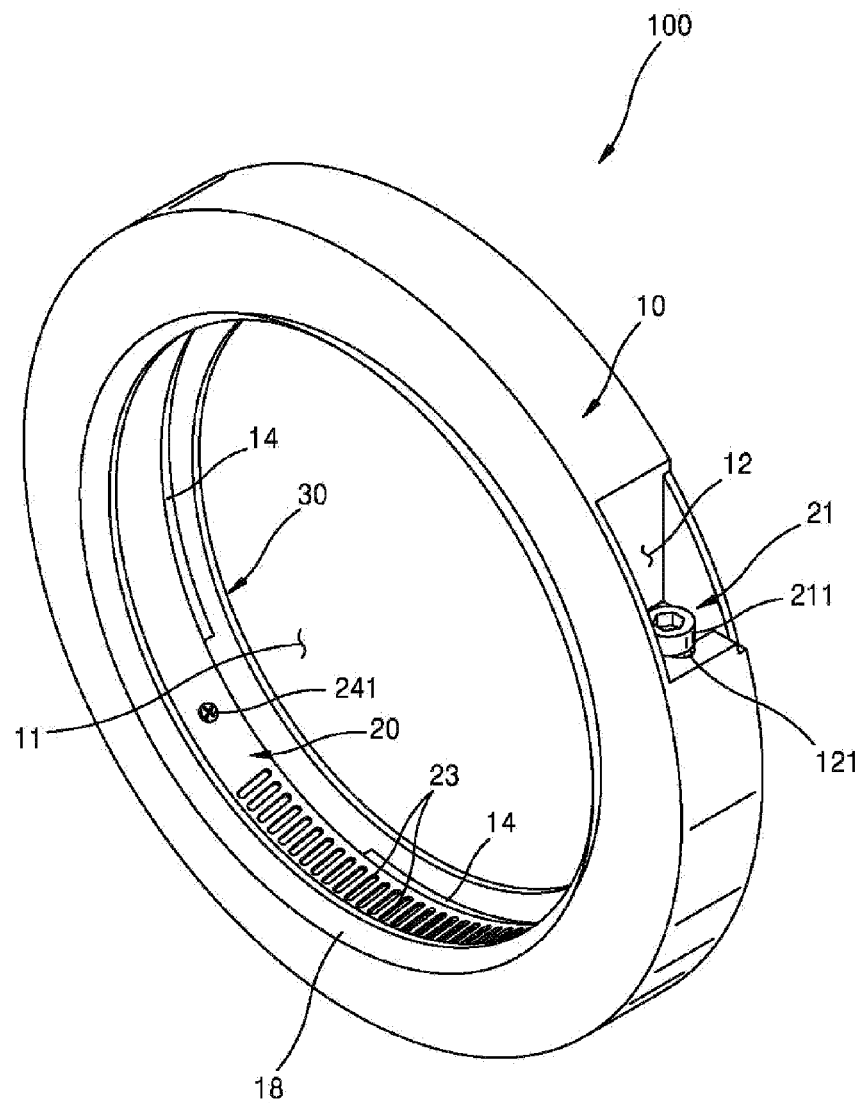
FIG. 3 is a perspective view of an embodiment of the pipe clamping device according to the present invention.
Figure 4:
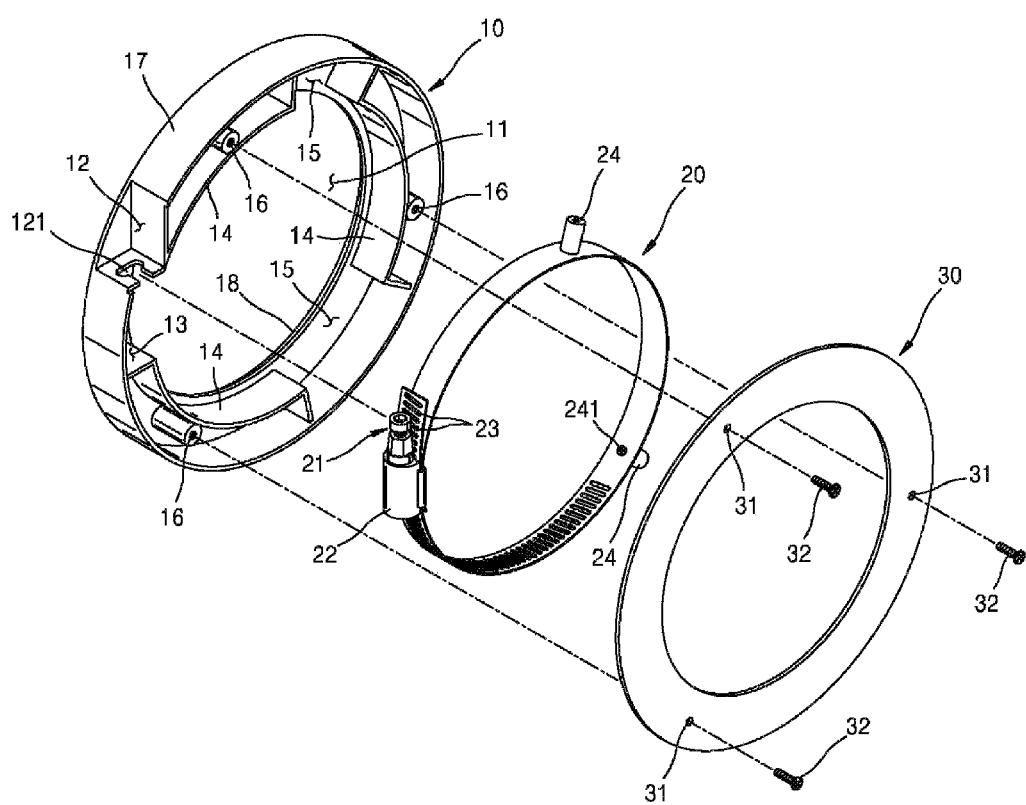
FIG. 4 is an exploded perspective view of the pipe clamping device of FIG. 3.
Figure 5:
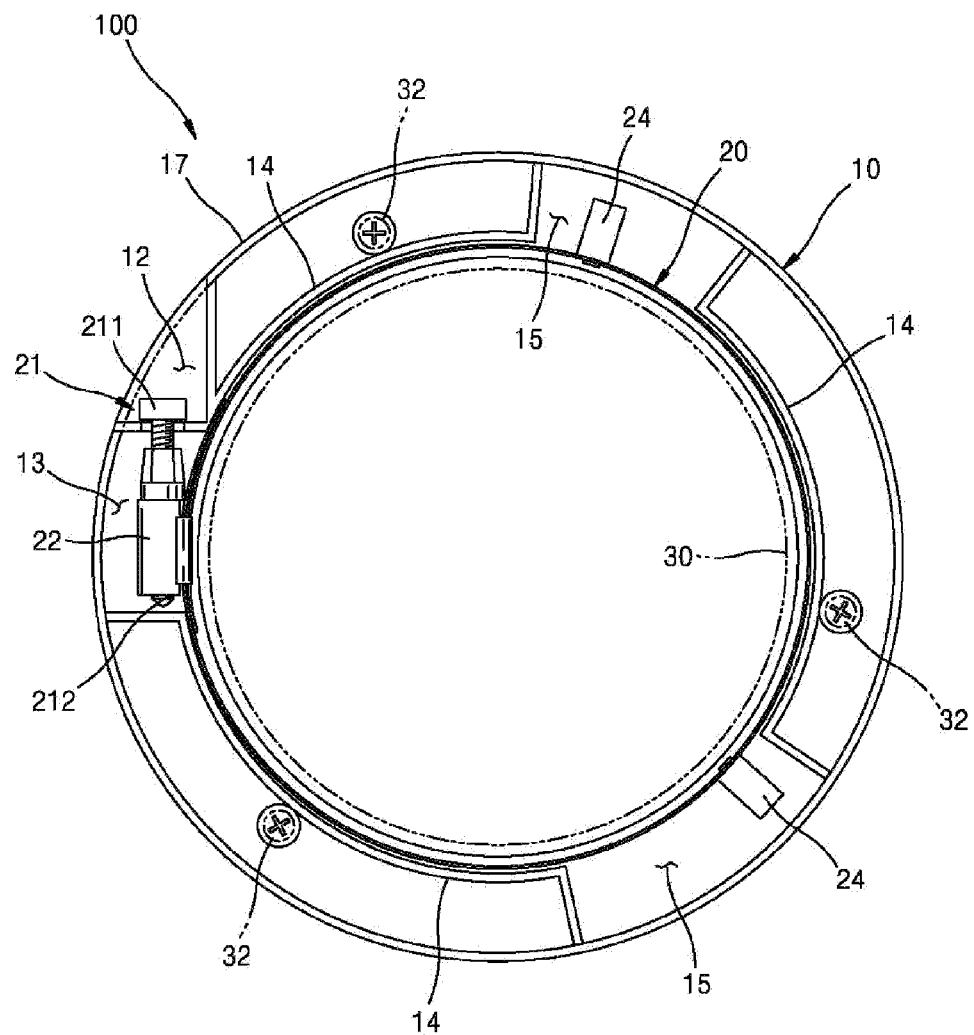
FIG. 5 is a rear view of the pipe clamping device of FIG. 3.

FIG. 3 is a perspective view of an embodiment of the pipe clamping device according to the present invention and FIG. 4 is an exploded perspective view of the pipe clamping device of FIG. 3. FIG. 5 is a rear view of the pipe clamping device of FIG. 3.

Referring to FIGS. 3 to 5, a pipe clamping device 100 according to one embodiment is a device for connecting and clamping a first pipe P1 and a second pipe P2, and comprises a case 10, a tightening member 20, and a cover 30.

The case 10, which may be made of plastic for example, is an annular member with an outer circumferential surface 17 and a circular central opening 11 into which the first pipe P1 and the second pipe P2 are inserted. In this embodiment, the center of the central opening 11 corresponds to the center of the outer circumferential surface.

The case 10, as illustrated in FIG. 4, is configured to have an open rear surface and includes an insertion guide 18 which is formed along an edge of the central opening 11 and protrudes forwardly from the case 10 such that its radius increases in the forward direction.

The case 10 includes stoppers 14 which restrict a radial movement of the tightening member 20 such that the diameter of the tightening member 20 does not extend beyond a predetermined value, the stopper being prepared in the case. In this embodiment, three stoppers 14 are formed in a distance along the edge of the central opening 11 and are formed by rearward-protruded channel partitions.

A couple of disengagement grooves 15 are formed between the neighboring stoppers 14 in the rear surface of the case 10.

An adjustment screw mounting space 13 inside which a thread part 212 of the adjustment screw 21 and an adjustment screw fixing member 22 are installed is formed between neighboring stoppers 14 in the rear surface of the case 10.

An adjustment screw exposure space 12 in which a head part 211 of the adjustment screw 21 is disposed is concavely formed in the outer circumferential surface 17 of the case 10 such that the head part 211 of the adjustment screw 21 does not protrude beyond the outer circumferential surface of the annular case.

An adjustment screw exposure groove 121 which connects the adjustment screw exposure space 12 and the adjustment screw mounting space 13 and which is open rearward is formed in the adjustment screw exposure space 12.

A connection hole 16 for coupling the cover 30 is formed between the stopper 14 and the outer circumferential surface of the case 10.

The tightening member 20, a circular band member which may be made of stainless steel, is arranged on the inner circumferential surface of the case so as to impose pressure on the outer circumferential surface of the first pipe P1 and the second pipe P2 being inserted into the central opening 11.

A tightening means including the tightening member 20 is used in this embodiment and the tightening member has a similar configuration with the so-called screw clamp described in the "Background of the Related Art." As illustrated in FIG. 4, the adjustment screw 21 with the head part 211 at one end and the thread part 212 at the other end and an adjustment screw fixing member 22 that rotatably fixes the adjustment screw 21 are combined at one end of the tightening member 20 and a plurality of adjustment slots 23 which coupled with the thread part 212 of the adjustment screw 21 are formed at the other end portion of the tightening member 20. Since the configuration and effects of the adjustment screw 21, the adjustment screw fixing member 22, and the adjustment slots 23 are widely understood by those skilled in the art, a detailed explanation about them will be omitted.

The tightening member 20 is configured such that, by rotating the adjustment screw 21 in a clockwise or counter-clockwise direction, it is movable between a tightening location where the tightening member 20 tightens to the outer circumferential surface of the first pipe P1 and the second pipe P2 and a disengagement location where the tightening member 20 does not impose pressure on the outer circumferential surfaces of the first pipe P1 and the second pipe P2.

To prevent the tightening member 20 from disengaging at the tightening location and the disengagement location from the case 10, a pair of disengagement prevention projections 24 protrude in a radial direction and are fixed by screws 241 to the outer circumferential surface of the tightening member 20.

The tightening member 20 is disposed between the rear face of the case 10 and the cover 30. Here, the adjustment screw fixing member 22 is inserted into the adjustment screw mounting space 13 of the case 10, the head part 211 of the adjustment screw 21 is disposed in the adjustment screw exposure space 12 of the case, and the disengagement prevention projections 24 are disposed in the disengagement prevention grooves 15 of the case 10.

The cover 30, which may be a plastic annular plate member, has a central opening into which the first pipe P1 and the second pipe P2 are inserted and has a shape for closing the open rear surface of the case 10.

A plurality of through holes 31 are provided in the cover 30 at the locations corresponding to the connection holes 16 of the case 10.

The cover 30 is detachably combined in the rear surface of the case 10 by screws 32 that penetrate the through holes 31 and connect with connection holes 16 of the case 10.

Figure 10:
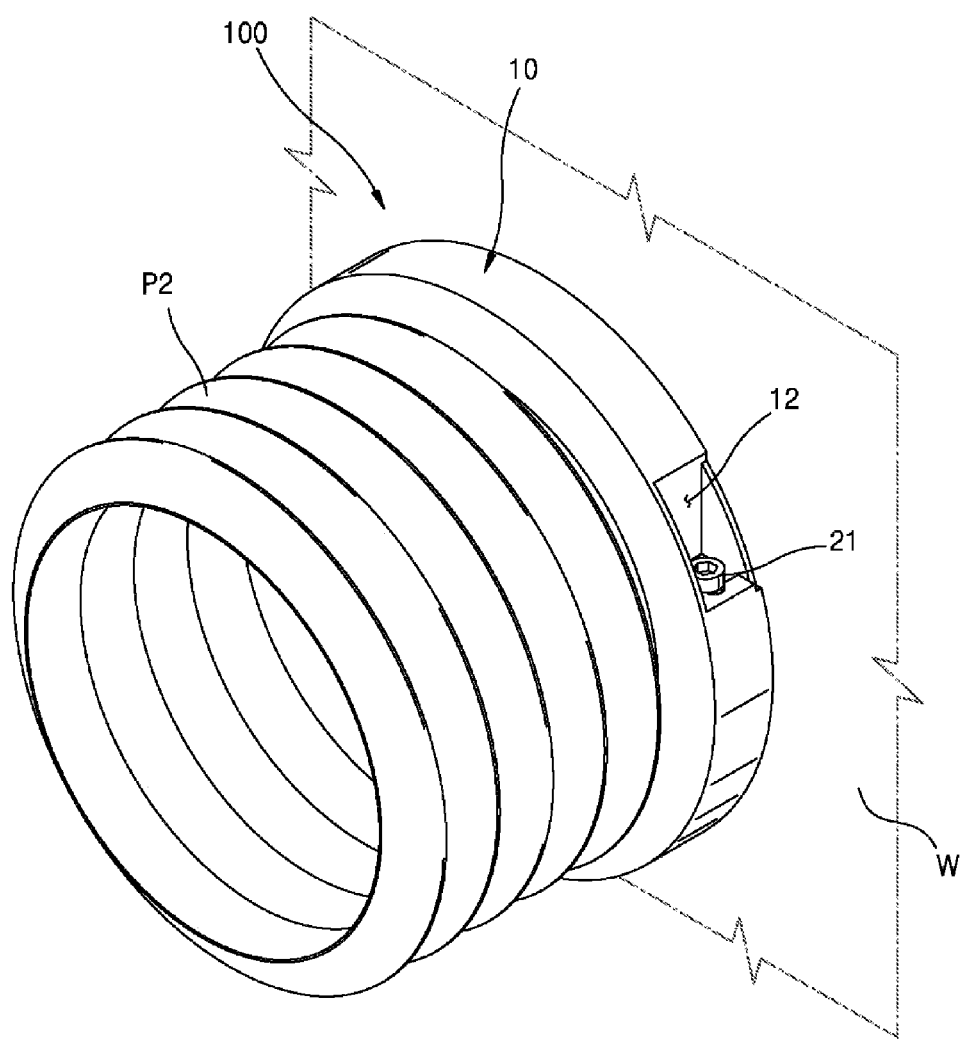
FIG. 10 is a perspective view illustrating the first pipe and the second pipe clamped together by the pipe clamping device of FIG. 3.

In this embodiment, as illustrated in FIG. 10, the tightening member 20 is not exposed externally after the installation is completed since the tightening member 20 is configured to expose only to the inner circumferential surface of the case 10 after the case 10 and the cover 30 are combined each other.

An embodiment using the pipe clamping device 100 described in the detail above will be explained below.

Figure 6:
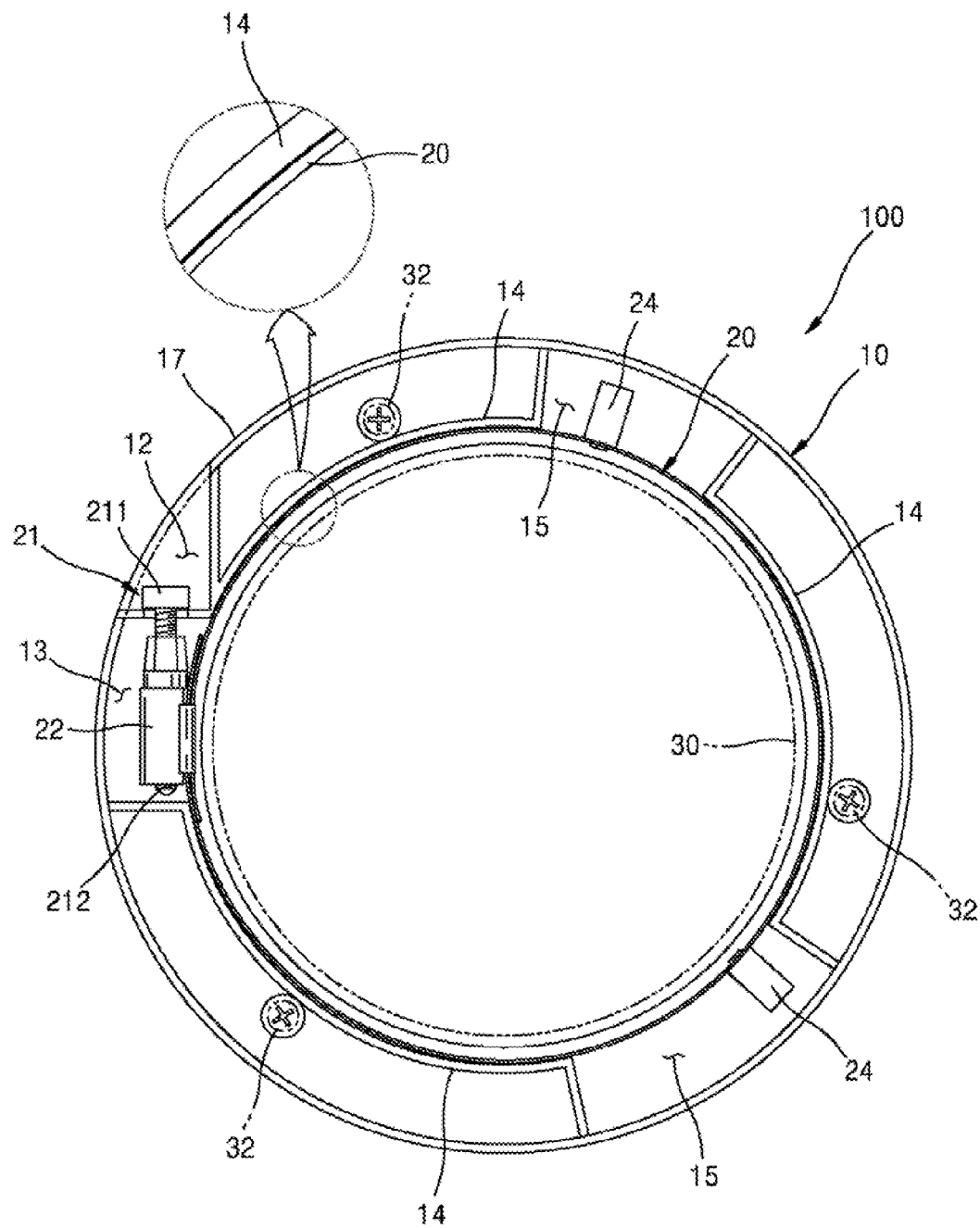
FIG. 6 is a rear view of the pipe clamping device of FIG. 5 at the disengagement location where the tightening member contacts to the stopper.

First, if the tightening member 20 is disengaged fully by rotating the adjustment screw 21 counterclockwise, the tightening member 20 contacts the stopper 14, as illustrated in FIG. 6, since the tightening member 20 moves to the disengagement location. Here, the tightening member 20 has reached the maximum diameter.

Figure 8:
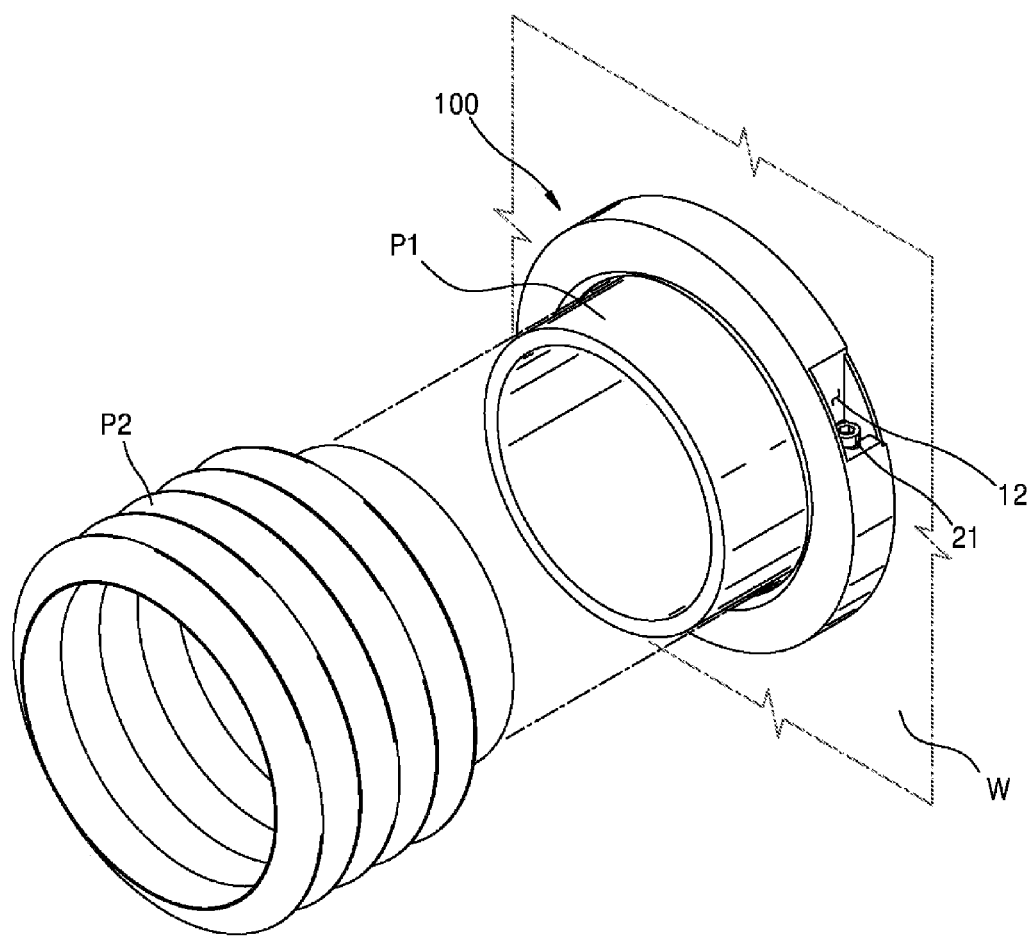
FIG. 8 is a perspective view of the pipe clamping device of FIG. 3 being inserted into a first pipe.

Then, to enable the cover 30 to contact to the wall W, the pipe clamping device 100 is inserted deeply into the first pipe P1 as illustrated in FIG. 8.

Figure 9:
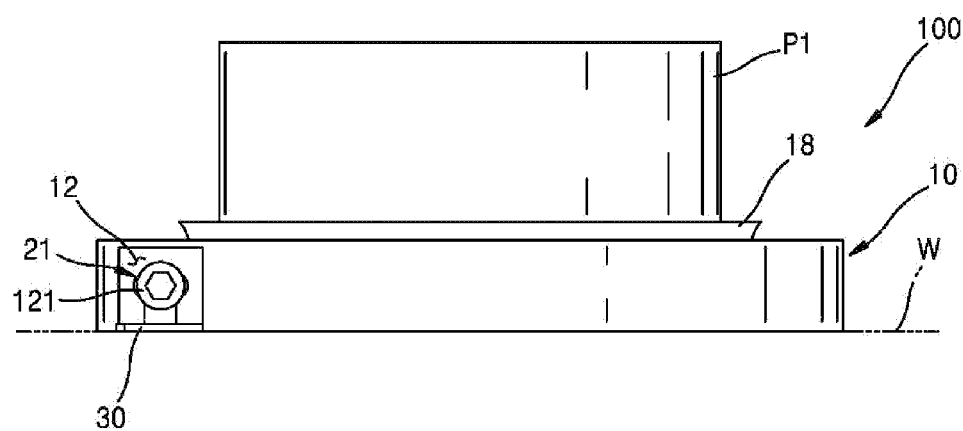
FIG. 9 is a side view of the pipe clamping device of FIG. 8.

As illustrated in FIGS. 8 and 10, if the second pipe P2 is inserted between the central opening 11 of the case 10 and the outer circumferential surface of the first pipe P1 after the pipe clamping device 100 is inserted into the first pipe P1. The second pipe P2 is inserted into the first pipe P1 such that the outer circumferential surface of the first pipe P1 overlaps to the inner circumferential surface of the second pipe P2. The second pipe P2 is easily inserted into the central opening 11 of the case 10 by the insertion guide 18 of the case 10 formed as illustrated in FIG. 9. It is preferable that the second pipe P2 is inserted deeply such that its end makes contact with the wall W.

Figure 7:
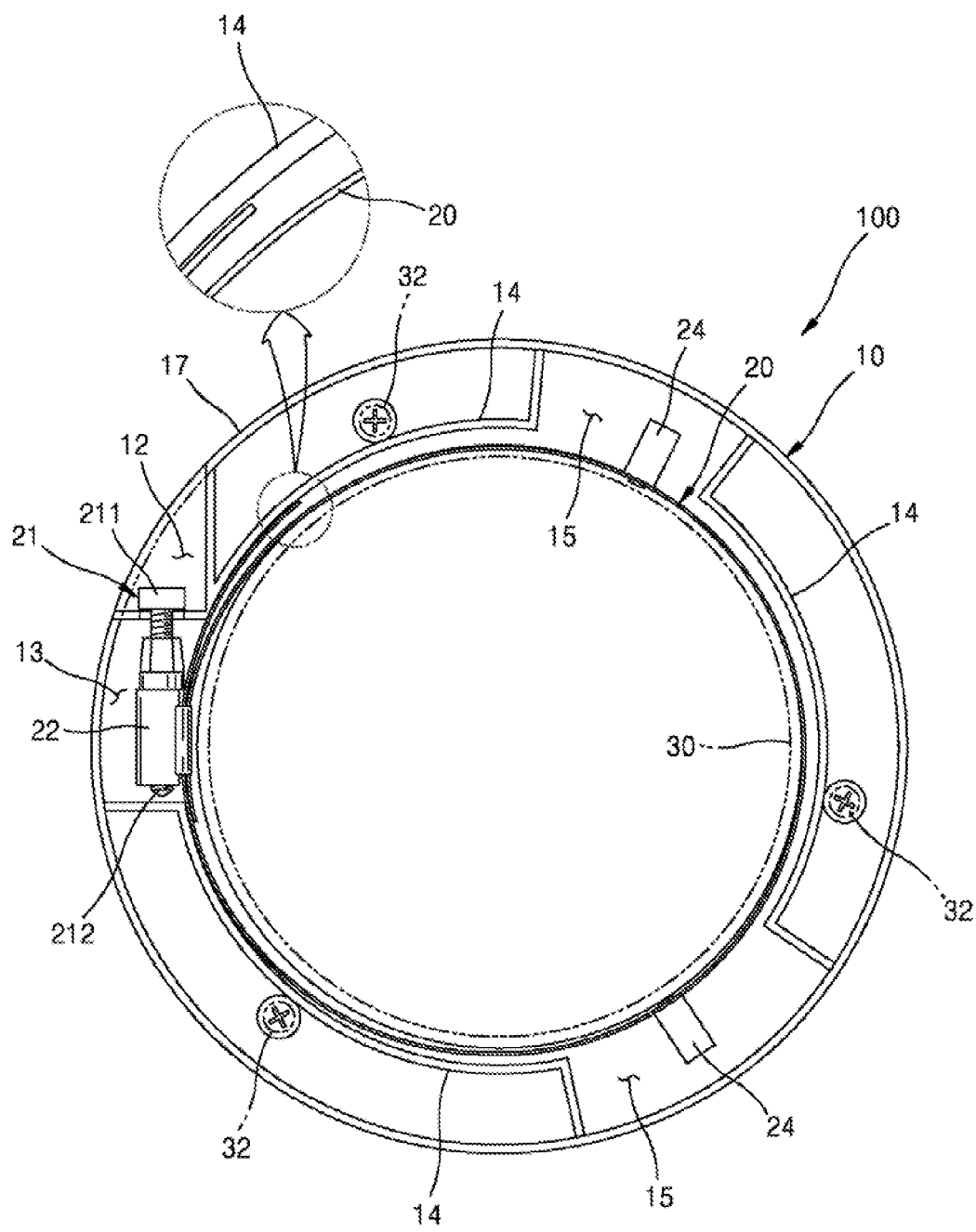
FIG. 7 is a rear view of the pipe clamping device of FIG. 5 at the tightening location where the tightening member disengages from the stopper.

Finally, if the tightening member 20 is gradually tightened by rotating the adjustment screw 21 clockwise, the tightening member 20 disengages from the stopper 14 as illustrated in FIG. 7, imposing pressure on the outer circumferential surface of the second pipe P2. If the adjustment screw 21 is completely tightened, the tightening member 20 moves to the tightening location, thereby imposing pressure on the outer circumferential surfaces of the first pipe P1 and the second pipe P2 at the same time and completing clamping of the first pipe P1 and the second pipe P2.

The pipe clamping device 100 described in detail above has an advantage that it easily clamps the pipes P1 and P2 because it comprises the annular case 10 having the central opening 11, the tightening member 20 which is disposed in the case 10 and movable between the tightening location where the tightening member 20 tightens outer circumferential surface of the pipes P1 and P2, and the disengagement location where the tightening member 20 does not impose pressure on the outer circumferential surface of the pipes P1 and P2, and the stopper 14 which is disposed in the case 10 and restricts the diameter of the tightening member 20 at the disengagement location and thus because the tightening member 20 has a predetermined diameter by the stopper 14 of the case 10.

Also, the pipe clamping device 100 has another advantage that, unlike the prior art pipe clamping device 1, it has a good aesthetic appearance and does not corrode easily by rain even if it is installed outdoors, since the tightening member 20 is disposed between the case 10 and the cover 30 and thus the tightening member 20 is not exposed externally after installation as illustrated in FIG. 10.

In addition, the pipe clamping device 100 has another advantage that the tightening member 20 does not disengage from the case 10 at the tightening location and the disengagement location since the tightening member 20 includes the disengagement prevention projections 24 which protrude in a radial direction and the case 10 includes the disengagement prevention grooves 15 into which the disengagement prevention projections 24 are inserted.

Furthermore, the pipe clamping device 100 has another advantage that the second pipe P2 can easily inserted into a space between the central opening 11 of the case 10 and the outer circumferential surface of the first pipe P1 since the case 10 includes the insertion guide 18 which is formed along edge of the central opening 11 and protrudes forwardly from the case 10 such that its radius increases in the forward direction.

Moreover, the pipe clamping device 100 has another advantage that the degree of tightening or disengagement can be easily adjusted by rotating the adjustment screw 21 gradually in a clockwise or counterclockwise direction since the tightening member 20 is gradually movable between the tightening location and the disengagement location by the adjustment screw 21 which has the head part 211 at one end and the thread part 212 at the other end and are rotatable in both direction.

The pipe clamping device 100 has another advantage that it has a good aesthetic appearance since the head part 211 of the adjustment screw 21 is not exposed outside and that there is no issue of damage by an external impact, because the case 10 has the outer circumferential surface 17 and has the adjustment screw exposure space 12 as a space for the head part 211 of the adjustment screw 21, the adjustment screw exposure space 12 being concavely formed such that the head part 211 of the adjustment screw 21 does not protrude beyond the circumferential outer surface 17 of the case 10.

Additionally, the pipe clamping device 100 has another advantage that it is easily manufactured by adding the disengagement prevention projections 24 to the so-called screw clamp described previously, because the pipe clamping device 100 comprises the adjustment screw 21 and the adjustment screw fixing member 22 which is fixed at one end of the tightening member 20 and rotatably fixes the adjustment screw 21, and a plurality of adjustment slots 23 which are formed at the other end of the tightening member 20 and coupled with the thread part 212 of the adjustment screw 21.

Also, the pipe clamping device 100 has another advantage that the adjustment screw fixing member 22 does not disengage from the case 10 at the tightening location and the disengagement location because the case 10 include the adjustment screw mounting space 13 into which the adjustment screw fixing member 22 is disposed. That is, in one embodiment, the tightening member 20 does not disengage from the case 10 as the disengagement prevention grooves 15 and the disengagement prevention projections 24 work together and the adjustment screw fixing member 22 and the adjustment screw mounting space 13 work together.

Further, the pipe clamping device 100 has another advantage that it is easy to form the case 10 using a mold and to install the tightening member 20 and its comprising elements 21, 22, 24 in the case 10, because the rear surface of the case 10 is open, the tightening member 20 is disposed from the rear surface of the case 10, and the case 10 includes the cover 30 which is detachably combined with the case 10 closing the rear surface of the case 10.

Although the case 10 and the cover 30 are described as being made of plastic materials in this embodiment, they may be made of a metal material such as aluminum or iron.

The disengagement prevention projections 24 are fixed to the tightening member 20 by screws 241, but may be fixed to the tightening member 20, such as by a welding or electric spot welding.

While this invention has been particularly shown and described with reference to exemplary embodiment thereof, it will be understood by those skilled in the art that various changes in form and details may be made therein without departing from the spirit and scope of the invention as defined by the appended claims.

REFERENCE NUMERALS 1 prior art pipe clamping device
2 band
3 adjustment screw
4 adjustment screw fixing member
5 adjustment slot
10 case
11 central opening
12 adjustment screw exposure space
13 adjustment screw mounting space
14 stopper
15 disengagement prevention groove
16 connection hole
17 outer circumferential surface
18 insertion guide
20 tightening member
21 adjustment screw
22 adjustment screw fixing member
23 adjustment slot
24 disengagement prevention projection
30 cover
31 through hole
32 screw
100 pipe clamping device
121 adjustment screw exposure groove
211 head part of adjustment screw
212 thread part of adjustment screw
241 screw
P1 first pipe
P2 second pipe
W wall

What is claimed is:

1. A pipe clamping device for clamping a first pipe and a second pipe, the pipe clamping device comprising:
    an annular case with a central opening into which the first pipe and the second pipe are inserted;
    a tightening member movable between a tightening location where the tightening member tightens an outer circumferential surface of the first pipe and the second pipe and a disengagement location where the tightening member does not impose pressure on the outer circumferential surface of the first pipe and the second pipe, the tightening member being an annular member and being disposed in the inner region of the circumferential surface of the case and releasably combined to the case; and
    a stopper restricting a radial movement of the tightening member such that a diameter of the tightening member at the disengagement location does not extend beyond a predetermined value, the stopper being formed in the annular case,
    wherein, to prevent the tightening member from disengaging from the case at the tightening location and the disengagement location, the tightening member comprises a disengagement prevention projection protruded in an outwardly radial direction and the annular case comprises a disengagement prevention groove into which the disengagement prevention projection is inserted.

2. The pipe clamping device of claim 1, wherein the case comprises an insertion guide which is formed along an edge of the central opening and forwardly protruded from the case such that its radius increases gradually in the forward direction.

3. The pipe clamping device of claim 1, wherein the tightening member further comprises:
    an adjustment screw rotatable in both directions, the adjustment screw having a head part at one end and a thread part at the other end
    whereby the tightening member, by the adjustment screw, is gradually movable between the tightening location and the disengagement location.

4. The pipe clamping device of claim 3, wherein the case further comprises:
    an outer circumferential surface; and
    an adjustment screw exposure space for disposing the head part of the adjustment screw, the adjustment screw exposure space being concavely formed in the outer circumferential surface of the case such that the head part of the adjustment screw does not protrude beyond the circumferential outer surface of the annular case.

5. The pipe clamping device of claim 3, wherein the tightening member further comprises:
    an adjustment screw fixing member which is fixed at one end of the tightening member and rotatably fixes the adjustment screw; and
    a plurality of adjustment slots which are formed at the other end of the tightening member and coupled with the thread part of the adjustment screw.

6. The pipe clamping device of claim 5, wherein the case comprises an adjustment screw mounting space into which the adjustment screw fixing member is inserted in order to prevent the adjustment screw fixing member from disengaging from the case.

7. A pipe clamping device for clamping a first pipe and a second pipe, the pipe clamping device comprising:
    an annular case with a central opening into which the first pipe and the second pipe are inserted;
    a tightening member movable between a tightening location where the tightening member tightens an outer circumferential surface of the first pipe and the second pipe and a disengagement location where the tightening member does not impose pressure on the outer circumferential surface of the first pipe and the second pipe, the tightening member being an annular member and being disposed in the inner region of the circumferential surface of the case and releasably combined to the case; and
    a stopper restricting a radial movement of the tightening member such that a diameter of the tightening member at the disengagement location does not extend beyond a predetermined value, the stopper being formed in the annular case,
    wherein the rear face of the case is open; the tightening member is disposed in the rear face of the case; a cover which is detachable is coupled with the rear face of the case, the cover being a plate type member with a central opening into which the first pipe and the second pipe are inserted; and the rear face of the case is closed by the cover.

8. The pipe clamping device of claim 7, wherein, to prevent the tightening member from disengaging from the case at the tightening location and the disengagement location, the tightening member comprises a disengagement prevention projection protruded in an outwardly radial direction and the annular case comprises a disengagement prevention groove into which the disengagement prevention projection is inserted.

9. The pipe clamping device of claim 7, wherein the case comprises an insertion guide which is formed along an edge of the central opening and forwardly protruded from the case such that its radius increases gradually in the forward direction.

10. The pipe clamping device of claim 7, wherein the tightening member further comprises:
   an adjustment screw rotatable in both directions, the adjustment screw having a head part at one end and a thread part at the other end
   whereby the tightening member, by the adjustment screw, is gradually movable between the tightening location and the disengagement location.

11. The pipe clamping device of claim 10, wherein the case further comprises:
   an outer circumferential surface; and
   an adjustment screw exposure space for disposing the head part of the adjustment screw, the adjustment screw exposure space being concavely formed in the outer circumferential surface of the case such that the head part of the adjustment screw does not protrude beyond the circumferential outer surface of the annular case.

12. The pipe clamping device of claim 10, wherein the tightening member further comprises:
   an adjustment screw fixing member which is fixed at one end of the tightening member and rotatably fixes the adjustment screw; and
   a plurality of adjustment slots which are formed at the other end of the tightening member and coupled with the thread part of the adjustment screw.

13. The pipe clamping device of claim 12, wherein the case comprises an adjustment screw mounting space into which the adjustment screw fixing member is inserted in order to prevent the adjustment screw fixing member from disengaging from the case.

* * * * *